Nov. 21, 1961     P. F. A. M. HENDRIKS     3,009,687
APPARATUS FOR THE REMOVAL OF DUST FROM GAS CONTAINING SAME
Filed Feb. 7, 1958
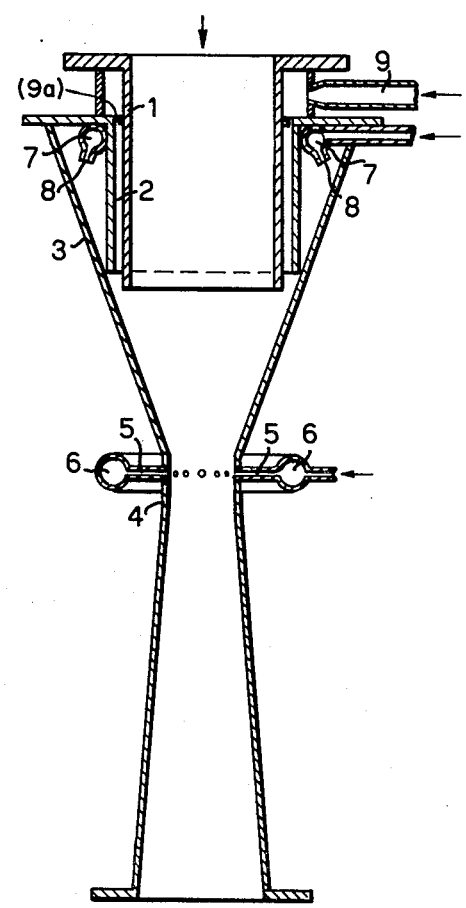
INVENTOR
PETRUS F.A.M. HENDRIKS
BY Cushman, Darby & Cushman
ATTORNEYS

United States Patent Office 3,009,687
Patented Nov. 21, 1961

3,009,687
APPARATUS FOR THE REMOVAL OF DUST
FROM GAS CONTAINING SAME
Petrus F. A. M. Hendriks, Sittard, Netherlands, assignor to Stamicarbon N.V., Heerlen, Netherlands
Filed Feb. 7, 1958, Ser. No. 713,956
Claims priority, application Netherlands Feb. 7, 1957
2 Claims. (Cl. 261—16)

This invention relates to a novel apparatus for the removal of dust from gas containing same.

Numerous proposals have been made for the purpose of removing dust from gases by washing the dust-laden gases with water or other liquid. Thus, it has previously been proposed to remove dust from gas by passing the dust-laden gas through suitable passage means leading to a moistening compartment followed by a dust-separating compartment, a flowing film of liquid being maintained on the internal surface of the passage means for the purpose of capturing and entraining the dust. According to this prior proposal, the dust-laden gas is delivered into the passage means by an inner feed pipe at a point in advance of the source of the liquid flow. The object of this arrangement is to avoid deposit of dust at a boundary between wet and dry parts of the passage wall since, if this occurs, some dust, rather than being entrained, will take up a small amount of liquid and will thereby cause serious caking of solid material.

It has been found, however, that even if the dust-laden gas is delivered into a wet passage in accordance with the abovementioned prior proposal, caking of solid still occurs against the delivery end and outside of the feed pipe. As a result, dust separation must be periodically interrupted in order that the apparatus can be cleaned.

The object of the present invention is to provide a dust removing apparatus which is free from the above-mentioned difficulties. A more specific object of the invention is to provide means for effectively reducing or avoiding undesired caking of solid material. Another object is the provision of a novel apparatus whereby dust removal can be effected over a longer period of time without the necessity of interrupting operations for the purpose of cleaning the equipment involved.

Broadly speaking, the foregoing objects are accomplished, according to the present invention, by means of apparatus which comprises a moistening compartment, a passage leading into this compartment, means for flowing a liquid film along the interior wall of the passage into the compartment, a feed pipe extending into the passage and spaced from the interior wall thereof, the feed pipe including a gas delivery end for delivering dust-laden gas into the passage at a point in advance of the region where the liquid film begins and means for flowing dust-free gas into the space between the interior wall of the passage and the feed pipe and around the pipe towards and past the delivery end thereof.

The dust-free gas may be a gas different from the dust-laden gas or it may be the same gas, e.g. gas recycled after purification. In the former case, it will usually be necessary to employ as the dust-free gas, a gas which is inert with respect to the dust-laden gas.

For the purposes of the invention, it is preferable to provide an additional pipe within the wet passage, surrounding the feed pipe for the dust-laden gas and in spaced relation thereto, to supply the dust-free gas along the space between the two pipes so that the outer pipe serves to direct the gas to the immediate vicinity of the delivery end of the inner pipe. It is also advantageous to deliver the water or other liquid from an opening or openings between the wall of the passage and the outer pipe. It has been found that apparatus constructed in this way may be kept in operation for outstandingly long periods of time without the necessity of being cleaned. Apparently these outstanding results are due to the fact that the outer pipe prevents water from splashing against the outside of the feed pipe for the dust-laden gas. Such splashing occurs when the outer pipe is omitted and, while the wet places formed on the outside of the feed pipe as a result of this splashing do not give rise to caking of the dust since, the supply of dust-free gas prevents any dust from being present in this space, the liquid splashed onto the outer wall of the feed pipe may reach the delivery end of this pipe and there come into contact with the dust-laden gas. If this occurs, the formation of a dust cake at the delivery end of the feed pipe begins. Thereafter, any further quantities of water transferred by splashing and eventually reaching the delivery end of the feed pipe are absorbed by dust cake previously formed, with the result that more caking takes place and the apparatus is eventually blocked up.

An embodiment of apparatus according to the invention is illustrated diagrammatically, and by way of example only, in the accompanying drawing. Referring more particularly to the drawing, the numeral 1 represents the lower end portion of the feed pipe for dust-laden gas which may be air or the like. End portion 1 is surrounded by a larger co-axial pipe 2 which is spaced therefrom and terminates short of the lower end of pipe 1 or at the same level. Pipes 1 and 2 are both surrounded by a still larger pipe 3 which narrows downwards and opens into the moistening compartment which in this case is the mouth 4 of a Venturi scrubber. As shown, water or other wash liquid may be fed into mouth 4 through channels 5 and annular tube 6.

In the space between the pipes 2 and 3 there is an annular tube 7, provided with openings 8. Water or other liquid may be supplied through the openings 8 to provide a film which flows down the inner surface of the pipe 3. The distance between the end of the pipe 2 and the widest pipe 3 is only slightly greater than the intended thickness of the liquid film which flows along the inside of the pipe 3 when the apparatus is in use. Means in the form of a tube 9 and openings 9a are provided for supplying dust-free gas into the space between pipes 1 and 2.

As a typical illustration of the manner in which the above described apparatus is used, a flow of gas (air) having a temperature of 500° C., and containing about 50 g. of dust per m.$^3$ is introduced through pipe 1. Water is supplied through annular tubes 6 and 7 and nitrogen is fed in through tube 9. The dust-laden gas is led downwardly through pipe 3 past the mouth 4 of the scrubber into a column filled with Raschig-rings (not shown in the drawing). After this treatment, the gas contained less than 0.25 g. of dust per m.$^3$. The apparatus continued to operate for over one month without any blockage. Blockage occurred quite frequently when the co-axial pipe 2 and supply of dust-free gas at 9 were eliminated. The pipe 2 serves to direct the dust-free gas immediately along the pipe 1 so that a lower feed rate of the dust-free gas serves to prevent dust from gathering between the pipes 1 and 3 than would be required in the absence of pipe 2.

The apparatus may be used in other than a vertical position provided care is taken to ensure that the entire inner wall of the passage through which the dust-laden gas passes is kept wet.

Although the invention has been particularly described as applied to apparatus in combination with a Venturi scrubber, it will be readily understood that the invention is not limited to this combination and may be used in any case where dust-laden gas is fed into a separating chamber for the purpose of trapping dust by means of a liquid. However, use of the present apparatus in combination with a Venturi scrubber offers the particular advantage that fluctuations which might occur in the supply of the dust-laden gas, and which normally strongly influence the cleaning capacity of the Venturi scrubber, can be compensated for by controlling the amount of dust-free gas in such a way that the total amount of gas passing through the mouth of the Venturi scrubber remains substantially constant. This control can be carried out automatically.

It will be appreciated that various modifications may be made in the invention described herein without deviating from the scope of the appended claims wherein:

I claim:

1. Apparatus for removing dust from gas containing same, said apparatus comprising a Venturi scrubber having a passage therethrough and which includes a converging conical part joining a diverging conical part and means for delivering liquid to the interior of the scrubber at the junction of the converging and diverging parts; means for flowing a liquid film along the interior wall of the converging conical part of said scrubber towards the mouth of said scrubber; an essentially unobstructed feed pipe extending into said converging conical part and spaced from the interior wall thereof, said feed pipe including a gas delivery end for delivering dust-laden gas into said passage at a point in advance of the region where said liquid film begins and means concentric with said feed pipe comprising an annular continuous shield surrounding said feed pipe and spaced intermediately between said pipe and said interior wall for flowing dust-free gas between said interior wall and said feed pipe and towards and past the delivery end thereof; said means for flowing a liquid film along the interior wall of said converging conical part of said scrubber being disposed between the interior of said conical part and said shield.

2. The apparatus of claim 1 wherein said shield terminates adjacent the delivery end of said pipe.

References Cited in the file of this patent

UNITED STATES PATENTS

| | | |
|---|---|---|
| 493,749 | Born et al. | Mar. 21, 1893 |
| 1,017,394 | Dvorak | Feb. 13, 1912 |
| 1,116,053 | Gagnon | Nov. 3, 1914 |
| 1,128,177 | Moser | Feb. 9, 1915 |
| 2,684,836 | Arborgh et al. | July 27, 1954 |
| 2,746,728 | Pomerleau | May 22, 1956 |
| 2,883,167 | Krantz | Apr. 21, 1959 |

FOREIGN PATENTS

| | | |
|---|---|---|
| 1,085,173 | France | July 21, 1954 |